(12) United States Patent
Lu et al.

(10) Patent No.: US 11,486,984 B2
(45) Date of Patent: Nov. 1, 2022

(54) THREE-DIMENSIONAL LIGHT DETECTION AND RANGING SYSTEM USING HYBRID TDC AND ADC RECEIVER

(71) Applicant: Beijing Voyager Technology Co., Ltd., Beijing (CN)

(72) Inventors: Yue Lu, Mountain View, CA (US); Tao Chu, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 898 days.

(21) Appl. No.: 16/232,977

(22) Filed: Dec. 26, 2018

(65) Prior Publication Data

US 2020/0209356 A1    Jul. 2, 2020

(51) Int. Cl.
*G01S 7/487* (2006.01)
*G01S 7/48* (2006.01)
(Continued)

(52) U.S. Cl.
CPC ............ *G01S 7/487* (2013.01); *G01S 7/4808* (2013.01); *G01S 17/10* (2013.01); *G01S 17/931* (2020.01)

(58) Field of Classification Search
CPC ...... G01S 7/4865; G01S 7/487; G01S 7/4873; G01S 7/4876; G01S 7/4861;
(Continued)

(56) References Cited

U.S. PATENT DOCUMENTS 5,760,887 A   6/1998   Fink et al.
5,896,425 A   4/1999   Hirano et al.
(Continued)

FOREIGN PATENT DOCUMENTS

CN    108089201 A    5/2018
EP    2541274 A2    1/2013

OTHER PUBLICATIONS

ACAM—TDC-GPX Ultra-high Performance 8 Channel Time-to-Digital Converter Datasheet (Year: 2007).*
(Continued)

*Primary Examiner* — Yuqing Xiao
*Assistant Examiner* — Amir J Askarian
(74) *Attorney, Agent, or Firm* — Kilpatrick, Townsend & Stockton, LLP; Justin Eurek (57) ABSTRACT

A method for operating a LiDAR system in an automobile that can include sending light pulses toward an object; receiving analog sensor data from an optical sensor measuring the light pulses reflected off the object; digitizing the analog sensor data using an analog to digital conversion system having a first sampling rate to generate a first set of processed sensor data and using a time to digital conversion system having a second sampling rate that is greater than the first sampling rate to generate a second set of processed sensor data; selecting the first set of processed sensor data when the analog sensor data is beneath a threshold signal to noise ratio; selecting the second set of processed sensor data when the analog sensor data exceeds the threshold signal to noise ratio; and calculating a range between the LiDAR system and the object by extracting time of flight data from the selected set of processed sensor data.

18 Claims, 7 Drawing Sheets

(51) Int. Cl.
*G01S 17/10* (2020.01)
*G01S 17/931* (2020.01)

(58) Field of Classification Search
CPC ........ G01S 7/4868; G01S 17/14; G01S 17/10;
G01S 17/931; G01S 17/42; G01S 7/4817;
G01S 7/4814; G01S 17/26; G01S 17/34;
G01S 7/4808; G01S 7/4815; G01S 7/484;
G01S 7/4911; G01S 7/4913; G01S 7/4917; G01S 7/493
See application file for complete search history.

(56) References Cited

U.S. PATENT DOCUMENTS

| | | | |
|---|---|---|---|
| 6,115,113 | A | 9/2000 | Flockencier |
| 6,259,514 | B1 | 7/2001 | Yoshida |
| 9,304,154 | B1 | 4/2016 | Droz et al. |
| 10,473,770 | B1 | 11/2019 | Zhu et al. |
| 2009/0273770 | A1 | 11/2009 | Bauhahn et al. |
| 2015/0319422 | A1 | 11/2015 | Fereyre et al. |
| 2015/0331107 | A1 | 11/2015 | Galera et al. |
| 2016/0003946 | A1 | 1/2016 | Gilliland et al. |
| 2016/0047900 | A1 | 2/2016 | Dussan |
| 2017/0090019 | A1 | 3/2017 | Slobodyanyuk et al. |
| 2017/0153319 | A1 | 6/2017 | Villeneuve et al. |
| 2018/0031703 | A1 | 2/2018 | Ngai et al. |
| 2018/0074196 | A1 | 3/2018 | Weinberg |
| 2018/0123611 | A1* | 5/2018 | Dutton ............... G01S 17/10 |
| 2018/0259625 | A1 | 9/2018 | Gnecchi et al. |
| 2018/0259627 | A1* | 9/2018 | Shinozuka ........... G01S 7/4865 |
| 2018/0259645 | A1 | 9/2018 | Shu et al. |
| 2021/0286082 | A1* | 9/2021 | Ohki ................... G01S 17/86 |

OTHER PUBLICATIONS

Texas Instruments—ADS7042 Ultra-Low Power, Ultra-Small Size, 12-Bit, 1-MSPS, SAR ADC (Year: 2014).*
RP Photonics—Avalanche Photodiodes (Year: 2016).*
U.S. Appl. No. 16/232,973, "Corrected Notice of Allowability", dated Oct. 2, 2019, 2 pages.
U.S. Appl. No. 16/232,973, "Notice of Allowance", dated Aug. 15, 2019, 8 pages.
EP18880056.9, "Extended European Search Report", dated Jan. 2, 2020, 7 pages.
EP18880056.9, "Office Action", dated Oct. 27, 2020, 5 pages.
PCT/US2018/067934, "International Preliminary Report on Patentability", dated Jul. 8, 2021, 8 pages.
PCT/US2018/067934, "International Search Report and Written Opinion", dated Nov. 7, 2019, 10 pages.
PCT/US2018/067937, "International Preliminary Report on Patentability", dated Jul. 8, 2021, 7 pages.
PCT/US2018/067937, "International Search Report and Written Opinion", dated Apr. 16, 2019, 10 pages.
PCT/US2018/068065, "International Preliminary Report on Patentability", dated Jul. 8, 2021, 7 pages.
PCT/US2018/068065, "International Search Report and Written Opinion", dated Apr. 2, 2019, 9 pages.
Notice of Allowance for U.S. Appl. No. 16/232,979, dated Jun. 20, 2022, 9 pages.

* cited by examiner

THREE-DIMENSIONAL LIGHT DETECTION AND RANGING SYSTEM USING HYBRID TDC AND ADC RECEIVER

CROSS-REFERENCES TO RELATED APPLICATIONS

The following three U.S. patent applications listed below (which includes the present application) are being filed concurrently, and the entire disclosures of the other applications are incorporated by reference into this application for all purposes:
Application Ser. No. 16/232,973 filed Dec. 21, 2018, entitled "MULTI-PULSE FUSION ANALYSIS FOR LIDAR RANGING";
Application Ser. No. 16,232,977, filed Dec. 21, 2018, entitled "THREE-DIMENSIONAL LIGHT DETECTION AND RANGING SYSTEM USING HYBRID TDC AND ADC RECEIVER"; and
Application Ser. No. 16/232,979 filed Dec. 21, 2018, entitled "MULTI-PULSE TECHNIQUE FOR IMPROVED DYNAMIC RANGE FOR INTENSITY INFORMATION IN LIDAR SYSTEMS.

BACKGROUND

Modern vehicles are often fitted with a suite of environment detection sensors that are designed to detect objects and landscape features around the vehicle in real-time that can be used as a foundation for many present and emerging technologies such as lane change assistance, collision avoidance, and autonomous driving capabilities. Some commonly used sensing systems include optical sensors (e.g., infra-red, cameras, etc.), radio detection and ranging (RADAR) for detecting presence, direction, distance, and speeds of other vehicles or objects, magnetometers (e.g., passive sensing of large ferrous objects, such as trucks, cars, or rail cars), and light detection and ranging (LiDAR).

LiDAR typically uses a pulsed light source and detection system to estimate distances to environmental features (e.g., vehicles, structures, etc.). In some systems, a laser or burst of light (pulse) is emitted and focused through a lens assembly and a reflection of the pulse off of an object is collected by a receiver. A time-of-flight (TOF) of the pulse can be measured from the time of emission to the time the reflected pulse is received, which may manifest as a single data point. This process can be repeated very rapidly across a desired range (typically 360 degrees over a 2D plane for ground-based vehicles, and a 3D region for aircraft) to form a collection of points that are dynamically and continuously updated in real-time, forming a "point cloud." The point cloud data can be used to estimate, for example, a distance, dimension, and location of the object relative to the LiDAR system, often with very high fidelity.

Despite the promise that LiDAR and other sensing systems bring to the continued development of fully autonomous transportation, there are challenges that limit the widespread adoption of LiDAR systems. In particular, LiDAR systems are often expensive, large, and bulky. Furthermore, a usable range of a LiDAR system may be limited which can limit the usefulness of the LiDAR system in certain applications.

BRIEF SUMMARY

This disclosure describes a hybrid digitization method by which range accuracy of a LiDAR system can be improved. In some embodiments, a method for operating a light detection and ranging (LiDAR) system in an automobile is described and includes the following: sending a plurality of light pulses toward an object; receiving raw sensor data from an optical sensor measuring the plurality of light pulses reflected off the object; digitizing the raw sensor data using an analog to digital conversion system having a first sampling rate to generate a first set of processed sensor data and using a time to digital conversion system having a second sampling rate that is greater than the first sampling rate to generate a second set of processed sensor data; selecting the first set of processed sensor data when the raw sensor data is beneath a threshold signal to noise ratio; selecting the second set of processed sensor data when the raw sensor data exceeds the threshold signal to noise ratio; and calculating a range between the LiDAR system and the object by extracting time of flight data from the selected set of processed sensor data.

In certain embodiments, a LiDAR system for a vehicle includes the following: an emitter module; a receiver module having an optical sensor; one or more processors; and one or more non-transitory computer-readable storage mediums containing instructions configured to cause the one or more processors to perform operations including: sending a plurality of light pulses toward an object from the emitter module; receiving raw sensor data from the optical sensor corresponding to light pulses of the plurality of light pulses reflected off the object at the receiver module; digitizing the raw sensor data using an analog to digital conversion system having a first sampling rate to generate a first set of processed sensor data and using a time to digital conversion system having a second sampling rate that is greater than the first sampling rate to generate a second set of processed sensor data; selecting the first set of processed sensor data when the raw sensor data is beneath a threshold signal to noise ratio; selecting the second set of processed sensor data when the raw sensor data exceeds the threshold signal to noise ratio; and calculating a range between the LiDAR system and the object using extracted time of flight data from the selected set of processed sensor data.

In certain embodiments, a LiDAR system can include one or more processors; a transmitter controlled by the one or more processors, the transmitter configured to generate a pulsed beam of light having M pulses; a receiver controlled by the one or more processors, the receiver configured to detect and store return pulses that comprise portions of the pulsed beam of light that has been reflected off of one or more objects, where each of the receivers are assigned an object detection threshold value defining a signal amplitude minimum value for the detected and stored return pulses that causes the LiDAR system to determine that an object is detected, Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Aspects of the present disclosure relate generally to object and environment detection systems, and more particularly to LiDAR systems, according to certain embodiments. In the following description, various examples of LiDAR-based systems using various types of LiDAR sensor data digitization and processing are provided. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Figure 1:
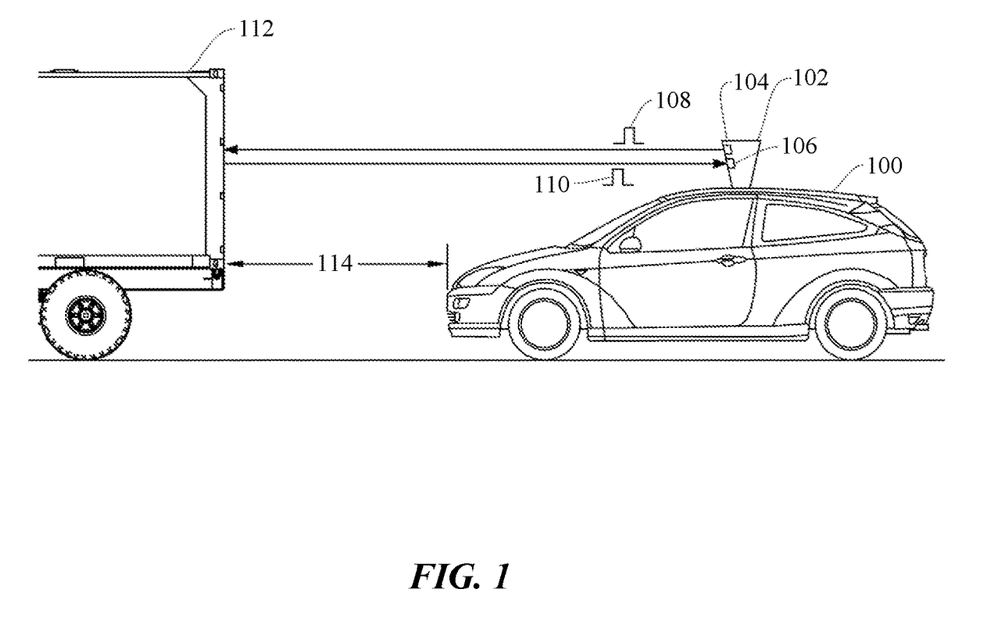
FIG. 1 shows a vehicle utilizing a LiDAR-based detection system, according to certain embodiments.

The following high level summary describes how aspects of the invention relate to an improved mobile LiDAR-based detection system, which may be mounted on a vehicle (e.g., automobile, unmanned aerial vehicle, etc.), as shown in FIG. 1. One of the problems that the present invention solves is the challenge of detecting objects over a large range (e.g., 10-500 m) with as much accuracy as possible (e.g., within 5 cm or less). For example, a light pulse reflected off an object at close range (e.g., less than 20-30 m) may be relatively easy to detect as a strength of the analog signal the detector generates from the reflected light pulse with respect to the ambient noise level (i.e., the signal-to-noise ratio (SNR) may be high. Return signal strength can depend on multiple factors including, but not limited to, the emitting signal strength, object reflectivity, system front end gain, etc. The noise floor can be dependent on the ambient light level and front end gain settings. Generally, in the same system an SNR decay due to separation between sensor and object is proportional to the inverse square of the separation. For example, the SNR at 30 m may be $\frac{1}{9}^{th}$ of the SNR at 10 m.

As such, a pulse reflected off an object at long range can be significantly weaker than a pulse reflected off an object at close range. For example, a pulse reflected off an object positioned more than 100-200 m away from the LiDAR system can have a relatively small amplitude that can make the reflected pulse difficult to distinguish from other sources of ambient light.

One way to optimize the accuracy of range data provided by reflected light pulses received at the LiDAR system is to use different analog to digital conversion techniques to interpret the analog sensor data associated with the reflected pulse. For example, a conventional analog to digital converter (ADC) can be configured to sample an amplitude of the analog sensor data at a first sampling rate of about 1 billion samples per second resulting in a sampling interval of about 1 nanosecond. A time to digital converter (TDC) can be configured to record an arrival time of the reflected pulses at a second sampling rate of about 100 billion samples per second resulting in a sampling interval of about 10 picoseconds. Since light travels about 30 cm in a nanosecond and only 0.3 cm in 10 picoseconds, the ability of the TDC to sample at a much higher rate substantially increases the accuracy of the LiDAR system by providing a more accurate time of flight of reflected pulses. However, the TDC is generally unable to provide reliable timing data when the SNR of the analog sensor data gets too low. A TDC system will typically be configured to ignore data falling below a predetermined power/intensity threshold to avoid a situation in which inaccurate sensor data is recorded. Because the processed sensor data provided by an ADC system includes amplitude data, additional signal processing procedures can be applied to the processed sensor data, thereby allowing detection of reflected pulses even when the reflected light pulses are below the noise floor.

The LiDAR system can include a selection mechanism that determines when to transition from using TDC derived range data to using ADC derived range data. In some embodiments, this selection mechanism can be configured to switch to utilizing TDC derived range data any time a predetermined number of reflected pulses are detected by the TDC system within a particular sampling window. This criteria for switching between range data sources can be effective where the TDC system is configured to ignore light falling below the noise floor. While TDC derived range data will typically be unusable for objects outside of a particular range from the LiDAR system this range will vary depending upon multiple factors. For example, an object having a particularly harder than average surface will generally provide stronger than average returns, thereby increasing the range at which TDC derived range data would be usable, whereas another object having a softer than average surface generally provides weaker than average returns. In some embodiments, the LiDAR system could be further configured to ignore TDC derived range data reflected off objects outside of a predetermined range from the LiDAR system as an additional safeguard to prevent the likelihood of applying erroneous TDC derived range data. This threshold could be implemented by configuring the TDC digitization module of the LiDAR system to ignore light pulse returns that fail to be detected within a threshold period of time corresponding to a predetermine threshold range. That range can vary based on an expected signal to noise ratio associated with the time of day and/or area through which the LiDAR system is passing. This range based threshold can be used in conjunction with or independent of a signal to noise based criteria.

In some use cases, when the ambient noise level is relatively stable, the threshold for switching between TDC and ADC derived data can depend solely upon signal level/intensity of the reflected light pulses. In such a configuration, TDC derived data would be used any time the signal level/intensity of the reflected light pulses exceeded a particular threshold for a predetermined number of returns. For example, after 1000 returns meet the requisite signal level/intensity, TDC derived range data could be relied upon in lieu of ADC derived range data.

By utilizing both types of digitization methods, the LiDAR system is able to obtain a technical effect of much higher range accuracy for close objects using TDC derived range data without losing the capability to track objects at greater distance using ADC derived range data. In this way, the LiDAR system is able to provide substantially more accurate data for closer objects that are more likely to affect the operation or safety of a vehicle utilizing the LiDAR system.

These and other embodiments are discussed below with reference to FIGS. 1-6; however, those skilled in the art will readily appreciate that the detailed description given herein with respect to these figures is for explanatory purposes only and should not be construed as limiting.

Typical System Environment for Certain Embodiments

FIG. 1 shows a vehicle 100 utilizing a LiDAR-based detection system, according to certain embodiments. Vehicle 100 can include a LiDAR system 102. LiDAR system 102 can allow vehicle 100 to perform object detection and ranging in a surrounding environment. Based on the result of object detection and ranging, vehicle 100 can, for example, maneuver to avoid a collision with the object. LiDAR system 102 can include an emitter module 104 and a receiver module 106. Emitter module 104 can be configured to project one or more light pulses 108 at various directions at different times in any suitable scanning pattern, while receiver module 106 can monitor for a return light pulse 110 which is generated by the reflection of light pulse 108 by an object. In some embodiments, light pulse 110 can take the form of collimated infrared or near infrared light. LiDAR system 102 can detect the object based on the reception of light pulse 110, and can perform a ranging determination (e.g., a distance of the object) based on a time difference between light pulses 108 and 110, which may be referred to as a time-of-flight. As indicated above, this operation can be repeated very rapidly over any desired range. In some cases, scanning (e.g., pulse emission and detection) may be performed over 360 degrees over a two-dimensional (2D) plane for ground-based vehicles (as vehicle detection systems may be primarily concerned with objects and environmental features on the ground), or over a three dimensional (3D) volumetric area for aircraft.

In some embodiments, a spinning mirror system (e.g., LiDAR system 102) may be used that can allow a single laser to aim over 360 degrees at a high rate of rotation (e.g., 500-5000 RPMs or more) over a single plane to form a collection of points (e.g., each point being an individual measurement such as one sent and reflected pulse) that are dynamically and continuously updated in real-time, forming a "point cloud." The point cloud data can be used to estimate, for example, a distance, dimension, and location of the object relative to the LiDAR system, often with a very high fidelity (e.g., within 2 cm). In some cases, a third dimension (e.g., height) may be performed in a number of different manners. For example, the spinning mirror system (or other suitable apparatus) can be moved up and down (e.g., on a gimbal or other actuating device) to increase the field of view (FOV) of the scan. Although not shown or discussed further, it should be understood that other LiDAR systems may be used to develop a point cloud and may incorporate the novel aspects of the various threshold-adjusted detection schemes described herein. For example, some scanning implementations may employ solid state, flash-based LiDAR units that can be configured to scan a 2D focal plane area. One of ordinary skill in the art with the benefit of this disclosure would appreciate the many alternative embodiments and modifications thereof.

Referring back to FIG. 1, LiDAR system 102 can transmit light pulse 110 (send signal) at a direction directly in front of vehicle 100 at time T1 and receive light pulse 110 (return signal) reflected by an object 112 (e.g., another vehicle) at time T2. Based on the reception of light pulse 110, LiDAR system 102 can determine that object 112 is directly in front of vehicle 100. Moreover, based on the time difference between T1 and T2, LiDAR system 102 can also determine a distance 114 between vehicle 100 and object 112, and may glean other useful information with additional received pulses including a relative speed and/or acceleration between the vehicles and/or dimensions of the vehicle or object (e.g., the width of the object in 2D, or a height and width (or portion thereof depending on the FOV) with 3D detection. Thus, vehicle 100 can adjust its speed (e.g., slowing or stopping) to avoid collision with object 112, or modulate systems such as adaptive cruise control, emergency brake assist, anti-lock braking systems, or the like, based on the detection and ranging of object 112 by LiDAR system 102.

Figure 2:
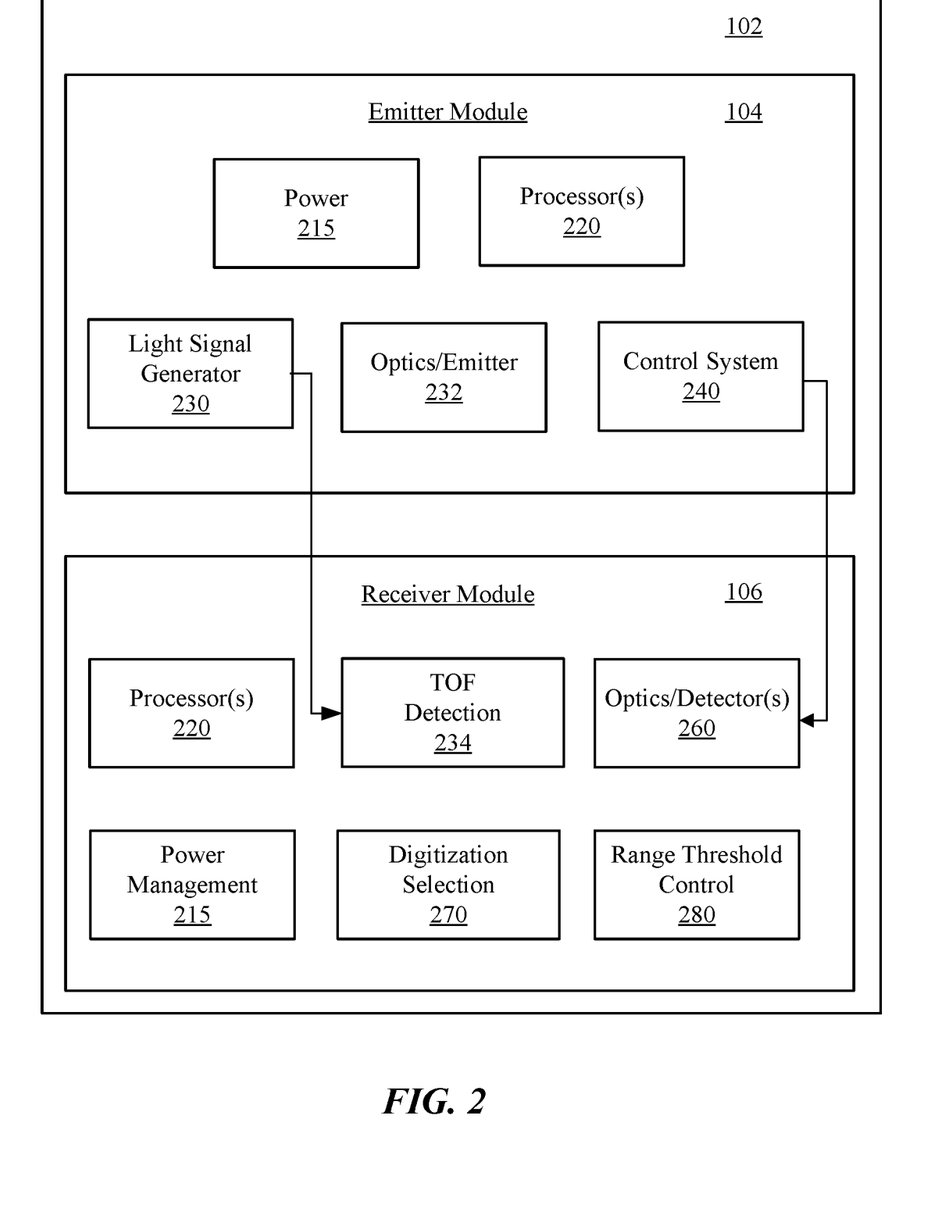
FIG. 2 is a simplified block diagram showing aspects of a LiDAR-based detection system 102, according to certain embodiments.

FIG. 2 is a simplified block diagram showing aspects of a LiDAR-based detection system 102, according to certain embodiments. LiDAR-based detection system 102 may be configured to transmit, detect, and process LiDAR signals to perform object detection as described above. In general, a LiDAR system 102 includes one or more transmitters (e.g., emitter module 104) and one or more receivers (e.g., receiver module 106). LiDAR system 102 may further include additional systems that are not shown or described to prevent obfuscation of the novel features described herein. In some embodiments, some or all aspects of LiDAR system 102 may be incorporated into any of the embodiments described herein, including but not limited to the embodiments shown and described with respect to FIGS. 2-5B.

Emitter module 104, as described above, can incorporate a number of systems that facilitate that generation and emission of a light signal, including dispersion patterns (e.g., 360 degree planar detection), pulse shaping and frequency control, TOF measurements, and any other control systems to enable the LiDAR system to emit pulses in the manner described above. In the simplified representation of FIG. 2, emitter module 104 can include processor(s) 220, light signal generator 230, optics/emitter module 232, power management block 215, and control system 240. Some or all of system blocks 220-240 can be in electrical communication with processor(s) 220.

In certain embodiments, processor(s) 220 may include one or more microprocessors (μCs) and can be configured to control the operation of LiDAR system 102. Alternatively or additionally, processor 220 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, ASIC, programmable logic device, and the like, may be configured in other system blocks of system 102. For example, control system block 240 may include a local processor responsible for managing certain control parameters (e.g., operation of the emitter and in some embodiments, coordination of the emitter with components of receiver module 106). Processor(s) 220 may control some or all aspects of emitter module 104 (e.g., optics/emitter 232, control system 240, etc.), receiver module 106 (e.g., processor(s) 220) or any aspects of LiDAR system 102. In some embodiments, multiple processors may enable increased performance characteristics in system 102 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Light signal generator 230 may include circuitry (e.g., a laser diode) configured to generate a light signal, which can be used as the LiDAR send signal, according to certain embodiments. In some cases, light signal generator 230 may generate a laser that is used to generate a pulsed laser beam at any suitable electromagnetic wavelengths spanning the visible light spectrum and non-visible light spectrum (e.g., ultraviolet and infra-red). In some embodiments, lasers are commonly in the range of 600-1200 nm, although other wavelengths are possible, as would be appreciated by one of ordinary skill in the art. In some use cases, light signal generator 230 may emit about 150,000 light pulses per second while in other embodiments, 500,000 to 1,000,000 light pulses per second can be emitted.

Optics/Emitter block 232 (also referred to as transmitter 232) may include one or more arrays of mirrors for redirecting and/or aiming the emitted laser pulse, mechanical structures to control spinning and/or moving of the emitter system, or other system to affect the system field-of-view, as would be appreciated by one of ordinary skill in the art with the benefit of this disclosure. For instance, some systems may incorporate a beam expander (e.g., convex lens system) in the emitter block that can help reduce beam divergence and increase the beam diameter. These improved performance characteristics may mitigate background return scatter that may add noise to the return signal. In some cases, optics/emitter block 232 may include a beam splitter to divert and sample a portion of the pulsed signal. For instance, the sampled signal may be used to initiate the TOF clock. In some cases, the sample can be used as a reference to compare with backscatter signals. Some embodiments may employ micro electromechanical mirrors (MEMS) that can reorient light to a target field. Alternatively or additionally, multi-phased arrays of lasers may be used. Any suitable system may be used to emit the LiDAR send pulses, as would be appreciated by one of ordinary skill in the art.

Power management block 215 can be configured to generate power for emitter module 104, receiver module 106, as well as manage power distribution, charging, power efficiency, and the like. In some embodiments, power management block 215 can include a battery (not shown), and a power grid within system 102 to provide power to each subsystem (e.g., control system 240, etc.). The functions provided by power management block 215 may be subsumed by other elements within emitter module 104, or may provide power to any system in LiDAR system 102. Alternatively, some embodiments may not include a dedicated power block and power may be supplied by a number of individual sources that may be independent of one another. In some embodiments power management block 215 can be configured to increase power output to light signal generator 230 in response to a signal to noise ratio detected by receiver module 106 being insufficient to provide sufficiently accurate range data for a particular operating environment. Power management block 215 can also be configured to reduce power output to light signal generator 230 in response to a particularly high signal to noise ratios for energy conservation purposes.

TOF detection module 234 may include a counter for measuring the time-of-flight of a round trip for a send and return signal. In some cases, TOF detection module 234 may be subsumed by other modules in LiDAR system 102, such as control system 240, optics/emitter 232, or other entity. TOF detection module 234 may implement return "windows" that limit a time that LiDAR system 102 looks for a particular pulse to be returned. For example, a return window may be limited to a maximum amount of time it would take a pulse to return from a maximum range location (e.g., 250 m). Some embodiments may incorporate a buffer time (e.g., maximum time plus 10%). TOF detection module 234 may operate independently or may be controlled by other system block, such as processor(s) 220, as described above. In some embodiments, emitter module 104 may not include a TOF detection module, as the receiver module 106 may perform this function. One of ordinary skill in the art with the benefit of this disclosure would appreciate the many modification, variations, and alternative ways of implementing the TOF detection block in system 102. For example, in some embodiments, TOF detection module 234 can receive the initial release time of the emitted pulses from light signal generator 230 as depicted or alternatively from processor 220 or control system 240 when they are in receipt of the release time for the light pulses. In this way, TOF detection module 234 can receive the initial release time from emitter module 104 and the receive time from optics/detector 260 (discuss in detail below).

Control system 240 may control aspects of light signal generation (e.g., pulse shaping), optics/emitter control, TOF timing, or any other function described herein. In some cases, aspects of control system 240 may be subsumed by processor(s) 220, light signal generator 230, TOF 234, or any block within emitter module 104, or LiDAR system 102 in general.

Receiver module 106 may include circuitry configured to detect and process a return light pulse to determine a distance of an object from LiDAR system 102, and in some cases determine the dimensions of the object, the velocity and/or acceleration of the object, and the like. Processor(s) 265 may be configured to perform operations such as processing received return pulses from detectors(s) 260, controlling the operation of TOF detection module 234, controlling threshold control module 280, or any other aspect of the functions of receiver module 106 or LiDAR system 102 in general.

Optics/Detector(s) 260 may detect incoming return signals that have reflected off of one or more objects. In some cases, LiDAR system 102 may employ spectral filtering based on wavelength, polarization, and/or range to help reduce interference, filter unwanted frequencies, or other deleterious signals that may be detected. Typically, optics/detector(s) 260 can detect an intensity of light and records data about the return signal (e.g., via coherent detection, photon counting, analog signal detection, or the like). Detector(s) 260 can use any suitable photodetector technology including solid state photodetectors (e.g., silicon avalanche photodiodes, complimentary metal-oxide semiconductors (CMOS), charge-coupled devices (CCD), hybrid CMOS/CCD devices) or photomultipliers. In some cases, a single receiver may be used or multiple receivers may be configured to operate in parallel. In some embodiments, the optics portion of optics/detector(s) 260 can be driven by control system 240 or processor(s) 220 and is configured to narrow a field of view of the detector or even slew the detector in a particular direction or directions to improve the signal to noise ratio associated with light pulses being detected. For example, the detector could be configured to rotate in coordination with scanning optics of optics/emitter 232.

Digitization selection module 270 may include systems and/or algorithms for selecting an appropriate sensor digitization method based on a signal to noise ratio of incoming reflected light pulses. Generally the digitization selection module 270 can be configured to prioritize range data provided by a time to digital conversion (TDC) system over range data provided by an analog to digital conversion (ADC) system since TDC systems tend to provide more accurate timing for range determination by TOF detection module 234. Real world testing has shown range data provided by TDC systems provide range data that is about 5 times more accurate than range data derived from ADC where a sampling rate of the ADC system can be between about 500 MHz and 1 GHz and the sampling rate of the TDC system is about 100 GHz. It should be noted that while the difference in sampling rate appear to improve accuracy by about 100 times, sampling rate increases can have diminishing returns due to other lower precision components in the LiDAR ranging system, resulting in a real-world improvement in range accuracy of about five times.

Digitization selection module 270 is configured to send data from the ADC to the TOF detection module when the TDC data becomes unavailable or unreliable. For example, when the LiDAR system is performing a scan pattern and reflected light pulses are being returned from a first object 15 meters away the digitization selection module will typically send the TDC data to TOF detection module 234 for range determination; however, once the scan pattern passes the first object and begins receiving reflected light pulses from an object farther away (e.g., over 75 meters) the digitization selection module will begin sending data from the ADC to TOF detection module 234. This change in digitization modes can be triggered in a number of different ways. In some embodiments, digitization selection module can include circuitry for determining a signal to noise ratio (SNR) for analog sensor data being returned from one or more of detectors 260. Once the SNR is determined to have fallen below a predetermined threshold, such as, e.g., 10 dB, digitization selection module 270 can switch from sending TDC data to sending ADC data to TOF detection module 234. In some embodiments, the SNR threshold can vary between 7 and 13 dB. In other embodiments, the TDC system can be configured to filter out any signals below a predetermined power level. This predetermined power level can correspond to an average ambient noise level expected during operation of a vehicle associated with LiDAR system 102.

In some embodiments, the predetermined power level can be varied by range threshold control 280, which can vary the power level threshold based on ambient noise levels in an environment surrounding LiDAR system 102. For example, ambient noise levels can be substantially lower at night or when travelling through a tunnel or under a bridge. When reflected light pulses are all below the noise level and being actively filtered out, digitization selection module 270 seeing no inputs from the TDC system will begin sending ADC data to TOF detection module 234. It should be noted that data from the ADC system is not discarded during use of TDC system as utilization of data from the ADC system can still be valuable in providing characterizing objects surrounding LiDAR system 102. For example, when an amplitude of a reflected light pulse is stronger than normal given a determined distance between LiDAR system 102 and an object, the system can determine that a surface of the object is particularly hard or solid. Range threshold control 280 can also be configured to automatically send ADC readings to TOF detection module 234 when ranges derived from TOF detection module 234 exceed a predetermined distance that corresponds to a furthest detectable distance associated with the TDC system.

Although certain systems may not be expressly discussed, they should be considered as part of system 102, as would be understood by one of ordinary skill in the art. For example, system 102 may include a bus system (e.g., CAMBUS) to transfer power and/or data to and from the different systems therein. In some embodiments, system 102 may include a storage subsystem (not shown). A storage subsystem can store one or more software programs to be executed by processors (e.g., in processor(s) 220). It should be understood that "software" can refer to sequences of instructions that, when executed by processing unit(s) (e.g., processors, processing devices, etc.), cause system 102 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein. Some software controlled aspects of LiDAR system 102 may include aspects of digitization selection module 270, threshold control 280, control system 240, TOF detection module 234, or any other aspect of LiDAR system 102.

It should be appreciated that system 102 is meant to be illustrative and that many variations and modifications are possible, as would be appreciated by one of ordinary skill in the art. System 102 can include other functions or capabilities that are not specifically described here. For example, LiDAR system 102 may include a communications block (not shown) configured to enable communication between LiDAR system 102 and other systems of the vehicle or remote resource (e.g., remote servers), etc., according to certain embodiments. In such cases, the communications block can be configured to provide wireless connectivity in any suitable communication protocol (e.g., radio-frequency (RF), Bluetooth, BLE, infra-red (IR), ZigBee, Z-Wave, Wi-Fi, or a combination thereof).

While system 102 is described with reference to particular blocks (e.g., threshold control block 280), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 102 may be combined with or operated by other sub-systems as informed by design. For example, power management block 215 and/or threshold control block 280 may be integrated with processor(s) 220 instead of functioning as separate entities.

Figure 3:
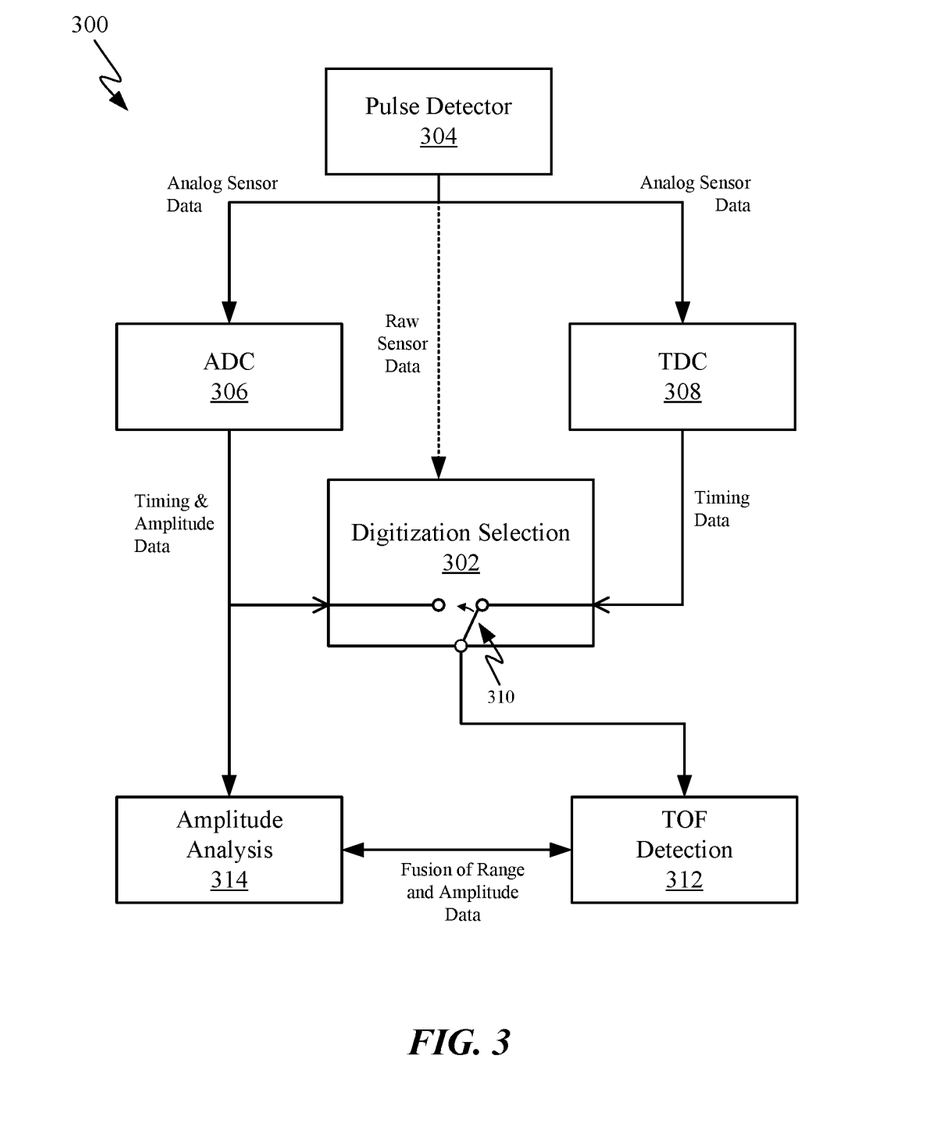
FIG. 3 shows how a digitization selection module interacts with other components of a receiver module.

FIG. 3 shows how a digitization selection module 302 interacts with other components of receiver module 300. In particular, pulse detector 304 can take the form of a photo-detector, CCD, CMOS sensor or photomultiplier configured to detect reflected light pulses from an emitter module of LiDAR system 102. In some embodiments, pulse detector 304 can concurrently transmit analog sensor data to both an ADC system 306 and TDC system 308. It should be noted that ADC system 306 can include a signal processor configured to help differentiate pulsed light detected by pulse detector from ambient noise. After the analog sensor data is processed by ADC and TDC systems 306 and 308, the processed data is then delivered to digitization selection module 302. Digitization selection module 302 includes a switching element 310 configured to select either processed data from ADC system 306 or TDC system 308 for transmission to TOF detection module 312. In some embodiments, digitization selection module can be configured to shift a position of switching element 310 toward ADC system 306 in response to a consistent pattern of light pulses detected by ADC system 306 not being identified by TDC system 308. Alternatively, digitization selection module 302 can be configured to measure a signal to noise ratio of the analog sensor data provided by pulse detector 304. The signal to noise ratio measured by digitization selection module 302 can be used to determine whether to send processed sensor data from ADC system 306 or TDC system 308. In some embodiments, switching element would be moved from TDC system 308 to ADC system 306 in response to the signal to noise ratio falling beneath a predetermined threshold of between 7 dB and 13 dB. In some embodiments, switching element 310 can take the form of a weighted switch that includes portions of both ADC and TDC derived range data. For example, in a situation where SNR is borderline for the use of TDC derived range data, 10-20% of the range data can be TDC derived range data. For example, only the TDC derived range data in the top 10-20% of the returns could be used in lieu of some of the ADC data. Other weights are also possible depending on the SNR and other factors affecting the accuracy of the range data. For example, a weighting criteria could take the form of using only that portion of the TDC derived range data that has a lower standard deviation than the ADC derived range data.

Regardless of which digitization system or combination of systems is selected, processed sensor data from ADC system 306, which includes timing and amplitude data is sent to amplitude analysis module 314 for performing further characterization of particular light pulses. In some embodiments, information derived from amplitude analysis module can be combined or fused with range data determined by TOF detection module 312 for use by a vehicle for autonomous driving. For example, in a scenario where an object is being detected at a boundary of a usable range of the TDC data, usable TDC readings could be used to refine data provided from ADC digitization to more accurately characterize a range to the object.

Figure 4A:
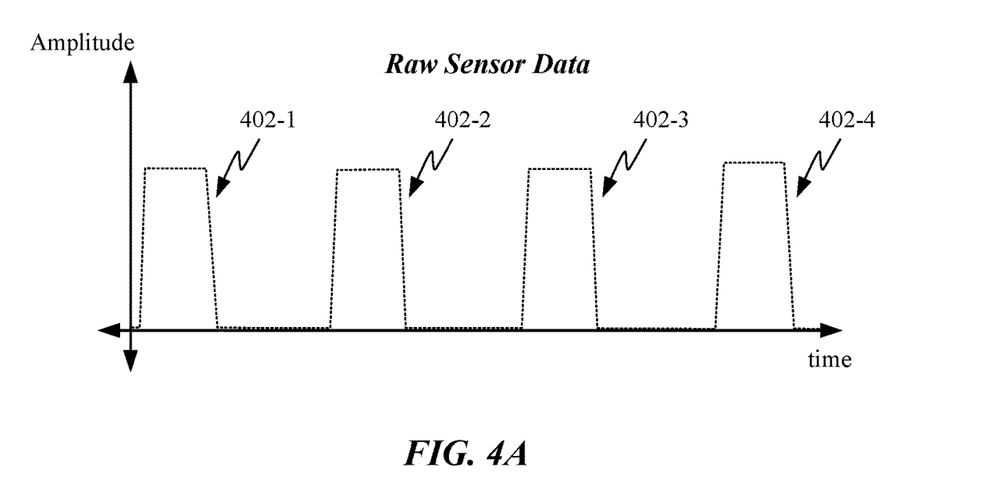
FIG. 4A depicts a series of exemplary reflected light pulses as detected by an optical sensor.
Figure 4B:
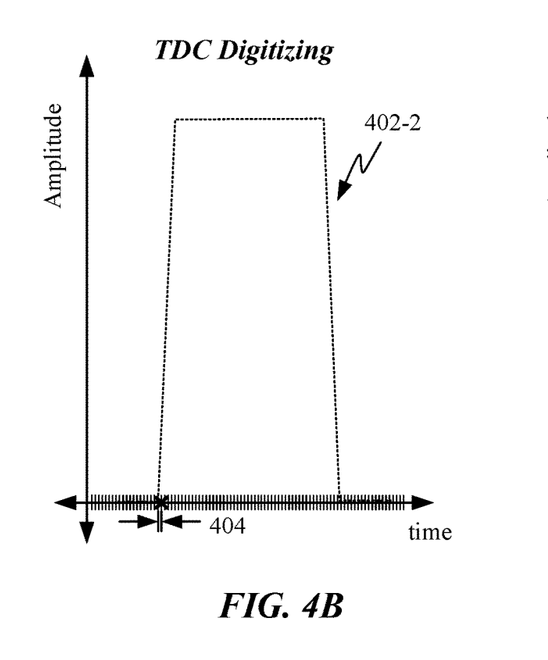
FIG. 4B shows a closer up view of one of the reflected light pulses depicted in FIG. 4A.

FIG. 4A depicts a series of exemplary reflected light pulses 402 as detected by an optical sensor, where the y-axis illustrates an amplitude of the light pulses and the x-axis illustrates time. This pattern of pulses can be consistent with light pulses being reflected off a hard surface at close range. FIG. 4B shows a closer up view of reflected light pulse 402-2 and the x-axis includes hash marks along the x-axis to illustrate an exemplary sample rate for a TDC system. The high sampling rate allows for quick detection of the light pulse, resulting in only a short delay 404 due to digitization of the analog signal.

Figure 4C:
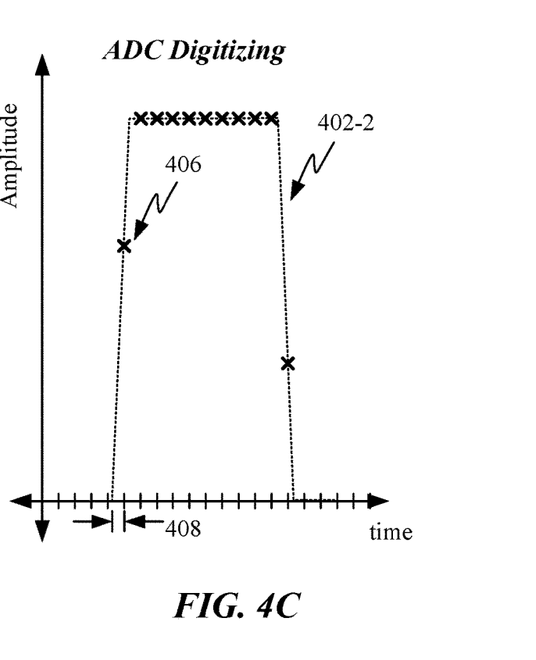
FIG. 4C, which shows the same reflected light pulse as FIG. 4B, illustrates the effect of the substantially slower sampling rate of an ADC system.

FIG. 4C, which shows the same reflected light pulse as FIG. 4B, illustrates the effect of the substantially slower sampling rate of an ADC system. In particular, the light pulse has ramped up over halfway to its maximum prior to data sample 406 being collected, thereby resulting in a substantially longer delay 408 due to digitization. While the longer delay may seem short, any time variation when measuring the time of flight of light can be quite detrimental to the accurate measurement of distance due to the speed of light and may result in being unable to achieve a desired spatial range resolution of 1-5 cm. In some embodiments, the TDC data may be fused with the ADC data to provide a more accurate picture of the shape of light pulse 402-2.

Figure 5A:
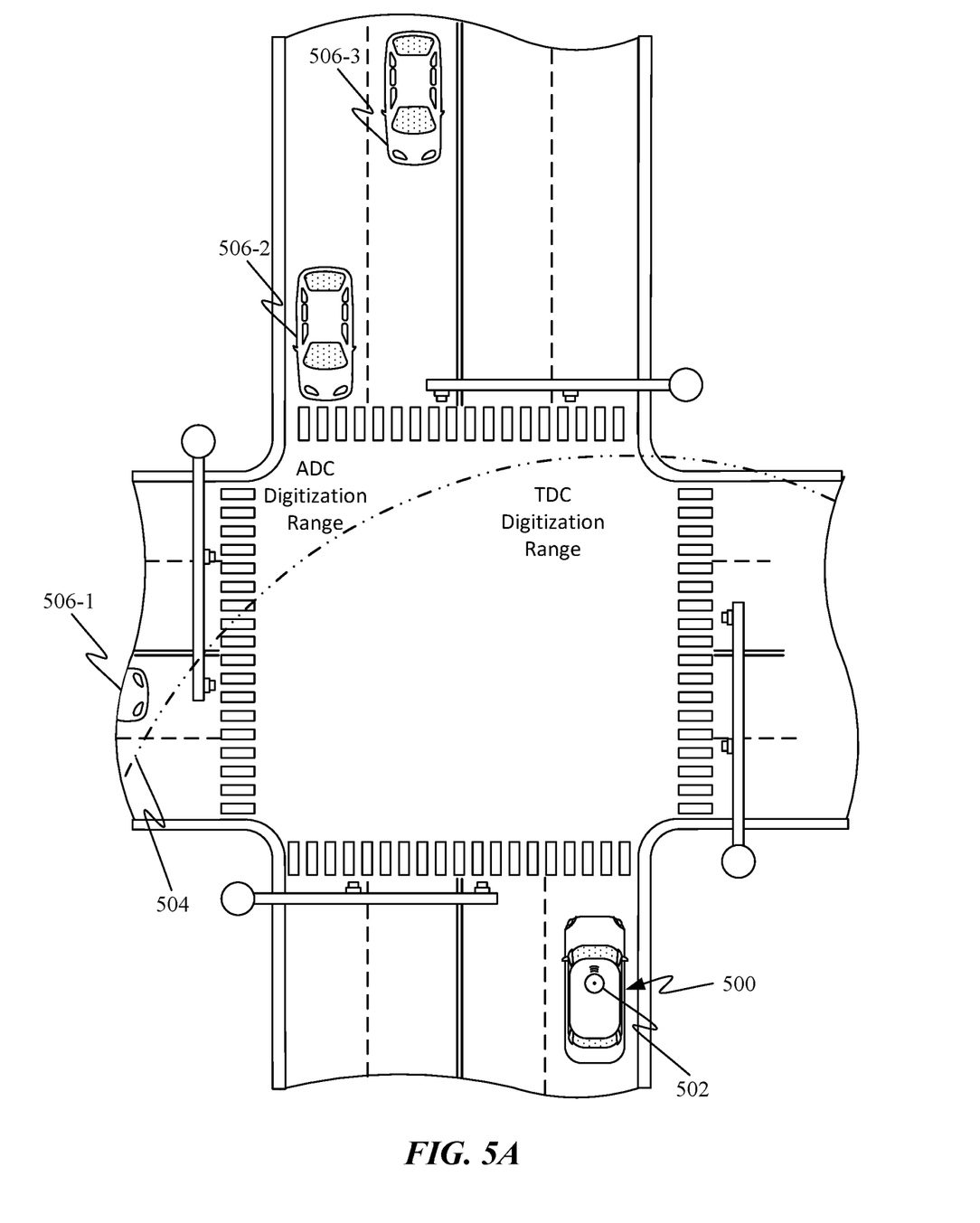
FIGS. 5A-5B depict views of an exemplary intersection being traversed by an autonomous vehicle.
Figure 5B:
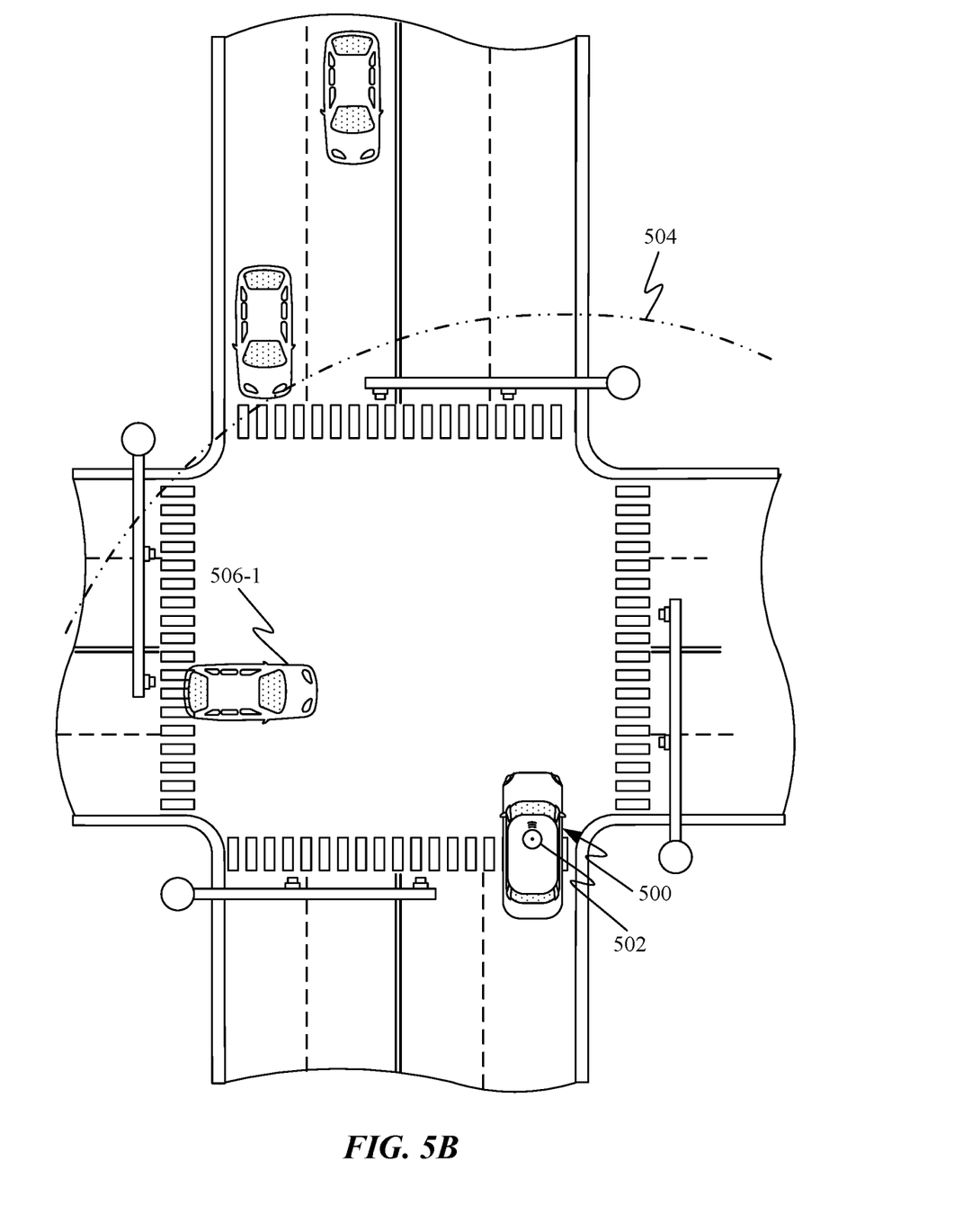

FIGS. 5A-5B depict views of an exemplary intersection being traversed by autonomous vehicle 500. FIG. 5A shows autonomous vehicle 500 includes scanning LiDAR system 502 mounted atop a roof of autonomous vehicle 500. Depending upon environmental factors and a system configuration of LiDAR system 502, LiDAR system 502 a range out to which the more accurate TDC system for digitization of can be employed varies. However for purposes of discussion, LiDAR system 502 can be said to be able to employ the TDC system out to a range of about 20 meters. Arc indicia 504 illustrates how a range of 20 meters from vehicle 500 allows substantial coverage of an intersection of two four lane streets from the position of vehicle 500 approaching a cross-walk of the intersection. While vehicles 506 are positioned just outside this range where TDC derived range data can be used, this does not mean LiDAR system 502 is not able to track the vehicles but that the range resolution is just slightly lower than ranging that could be provided by TDC derived range data.

FIG. 5B shows how as vehicle 500 enters the intersection vehicle, light pulses reflected off any portion of the intersection can be processed by the TDC system digitization process, thereby providing increased characterization of those objects. For example, an autonomous driving system receiving inputs from LiDAR system 502 can be configured to predict that vehicle 506-1 was likely to enter the intersection due to its failure to slow sufficiently to stop at the crosswalk. Once vehicle 506-1 enters the intersection and its range being derived from TDC digitized data that provides higher levels of accuracy, a likely path of vehicle 506-1 through the intersection can be more accurately predicted allowing the autonomous driving system to provide avoidance maneuvers to vehicle 500 that are more likely to help avoid a collision with vehicle 506-1. In some embodiments, a transition from using ADC derived range data to using TDC derived range data can be made by comparing the preceding 1000 returns from the ADC derived range data for a particular object, such as vehicle 506-1, to the TDC derived range data. A standard deviation of the ADC and TDC derived range data can then be compared and when the standard deviation of the TDC derived range data is lower than the standard deviation of the ADC derived range data, the system can begin relying upon TDC derived range data.

In some embodiments, LiDAR system 502 can include certain thresholds above which a prioritized signal can be sent to a system responsible for maneuvering vehicle 500. The thresholds can relate to a number of different parameters or combinations of parameters to include distance to an object, velocity of the object and the like. For example, a prioritized signal could be sent in response to an object having a velocity corresponding to an intercept course and being within a predetermined distance from the vehicle.

Exemplary Computer Systems Implementing Aspects of Embodiments Herein

Figure 6:
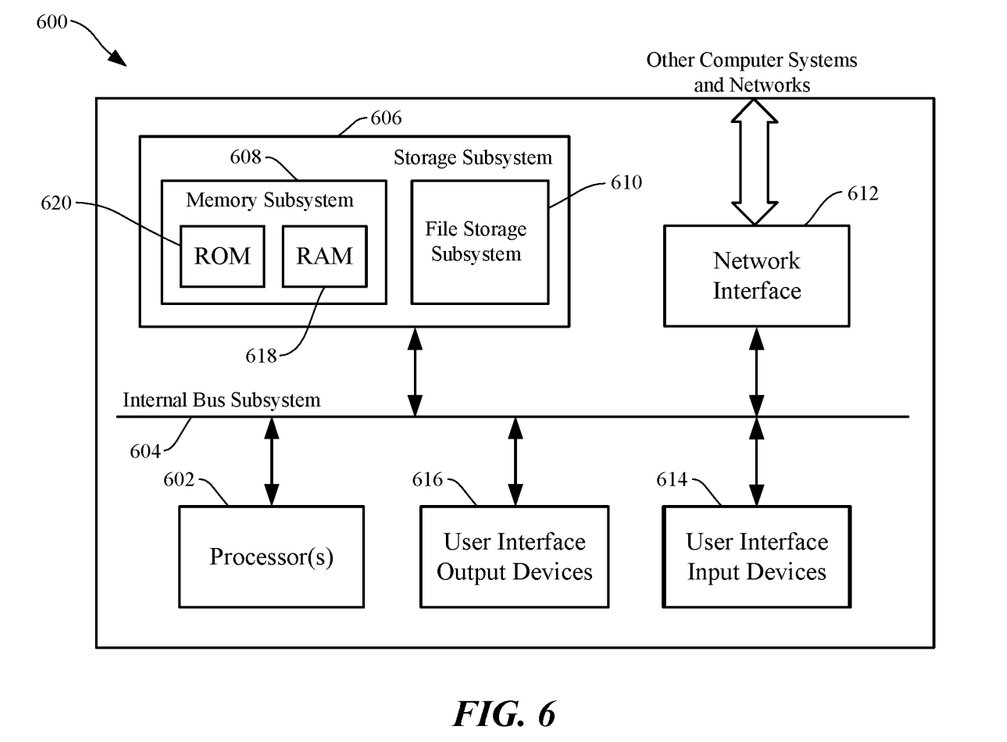
FIG. 6 is a simplified block diagram of computer system 600 configured to operate aspects of a LiDAR-based detection system, according to certain embodiments.

FIG. 6 is a simplified block diagram of computer system 600 configured to operate aspects of a LiDAR-based detection system, according to certain embodiments. Computer system 600 can be used to implement any of the systems and modules discussed above with respect to FIGS. 1-5B. For example, computer system 600 may operate aspects of range threshold control 280, TOF detection module 234, processor(s) 220, control system 240, or any other element of LiDAR system 200 or other system described herein. Computer system 600 can include one or more processors 602 that can communicate with a number of peripheral devices (e.g., input devices) via a bus subsystem 604. These peripheral devices can include storage subsystem 606 (comprising memory subsystem 608 and file storage subsystem 610), user interface input devices 614, user interface output devices 616, and a network interface subsystem 612.

In some examples, internal bus subsystem 604 (e.g., CAMBUS) can provide a mechanism for letting the various components and subsystems of computer system 600 communicate with each other as intended. Although internal bus subsystem 604 is shown schematically as a single bus, alternative embodiments of the bus subsystem can utilize multiple buses. Additionally, network interface subsystem 612 can serve as an interface for communicating data between computer system 600 and other computer systems or networks. Embodiments of network interface subsystem 612 can include wired interfaces (e.g., Ethernet, CAN, RS232, RS485, etc.) or wireless interfaces (e.g., ZigBee, Wi-Fi, cellular, etc.).

In some cases, user interface input devices 614 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 600. Additionally, user interface output devices 616 can include a display subsystem, a printer, or non-visual displays such as audio output devices, etc. The display subsystem can be any known type of display device. In general, use of the term "output device" is intended to include all possible types of devices and mechanisms for outputting information from computer system 600.

Storage subsystem 606 can include memory subsystem 608 and file/disk storage subsystem 610. Subsystems 608 and 610 represent non-transitory computer-readable storage media that can store program code and/or data that provide the functionality of embodiments of the present disclosure. In some embodiments, memory subsystem 608 can include a number of memories including main random access memory (RAM) 618 for storage of instructions and data during program execution and read-only memory (ROM) 620 in which fixed instructions may be stored. File storage subsystem 610 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and not intended to limit embodiments of the present disclosure. Many other configurations having more or fewer components than system 600 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A method for operating a light detection and ranging (LiDAR) system in an automobile, the method comprising:
    sending a plurality of light pulses toward an object;
    receiving analog sensor data from an optical sensor measuring the plurality of light pulses reflected off the object;
    digitizing the analog sensor data using an analog to digital conversion system having a first sampling rate to generate a first set of processed sensor data and using a time to digital conversion system having a second sampling rate that is greater than the first sampling rate to generate a second set of processed sensor data;
    selecting the first set of processed sensor data when the analog sensor data is beneath a threshold signal to noise ratio when the first set of processed sensor data includes a greater number of detected light pulses from the plurality of light pulses than the second set of processed data;
    selecting the second set of processed sensor data when the analog sensor data exceeds the threshold signal to noise ratio; and
    calculating a range between the LiDAR system and the object by extracting time of flight data from the selected set of processed sensor data.

2. The method as recited in claim 1, further comprising applying digital signal processing to the first set of processed sensor data to distinguish the plurality of light pulses from ambient noise.

3. The method as recited in claim 1, wherein a sampling rate of the time to digital conversion system is about 100 times greater than a sampling rate of the analog to digital conversion system.

4. The method as recited in claim 3, wherein the sampling rate of the analog to digital conversion system is about 1 GHz.

5. The method as recited in claim 1, further comprising:
    sending a prioritized signal to a system configured to maneuver the vehicle when the calculated range between the LiDAR system and the object corresponds to a high likelihood of collision between the vehicle and the object.

6. The method as recited in claim 1, wherein the optical sensor is configured to monitor between 500,000 and 1,000,000 light pulses per second.

7. The method as recited in claim 1, further comprising:
    determining a velocity of the object relative to the vehicle based on changes in the calculated range over time.

8. The method as recited in claim 1, wherein the time to digital conversion system has a power level threshold that varies with ambient noise levels to filter noise out of the ambient noise.

9. A LiDAR system for a vehicle, comprising:
    an emitter module;
    a receiver module, comprising an optical sensor;
    one or more processors; and
    one or more non-transitory computer-readable storage mediums containing instructions configured to cause the one or more processors to perform operations including:
        sending a plurality of light pulses toward an object from the emitter module;
        receiving analog sensor data from the optical sensor corresponding to light pulses of the plurality of light pulses reflected off the object at the receiver module;
        digitizing the analog sensor data using an analog to digital conversion system having a first sampling rate to generate a first set of processed sensor data and using a time to digital conversion system having a second sampling rate that is greater than the first sampling rate to generate a second set of processed sensor data;
        selecting the first set of processed sensor data when the analog sensor data is beneath a threshold signal to noise ratio;

selecting the second set of processed sensor data when the analog sensor data exceeds the threshold signal to noise ratio;

calculating a range between the LiDAR system and the object using extracted time of flight data from the selected set of processed sensor data; and switching from the second set of processed data to the first set of processed data when:

the first set of processed sensor data includes a larger number of detected light pulses of the plurality of light pulses than the second set of processed sensor data.

10. The LiDAR system as recited in claim 9, wherein the sampling rate of the time to digital conversion system is substantially faster than the sampling rate of the analog to digital conversion system.

11. The LiDAR system as recited in claim 9, wherein the receiver module comprises a photodetector.

12. The LiDAR system as recited in claim 9, wherein the emitter system comprises a laser than generates and emits the plurality of light pulses toward the object.

13. The LiDAR system as recited in claim 9 wherein the one or more non-transitory computer-readable storage mediums contain further instructions configured to cause the one or more processors to perform operations including:

detecting the ambient noise level adjacent to the vehicle; and adjusting a power threshold of the time to digital system based on the detected ambient noise level.

14. The LiDAR system as recited in claim 9, wherein the optical sensor is a scanning sensor.

15. A LiDAR system for a vehicle, comprising:

one or more processors; and one or more non-transitory computer-readable storage mediums containing instructions configured to cause the one or more processors to perform operations including:

sending a plurality of light pulses toward an object;

receiving analog sensor data from an optical sensor measuring the plurality of light pulses reflected off the object;

digitizing the analog sensor data using an analog to digital conversion system having a first sampling rate to generate a first set of processed sensor data and using a time to digital conversion system having a second sampling rate that is greater than the first sampling rate to generate a second set of processed sensor data;

selecting the first set of processed sensor data when the analog sensor data is beneath a threshold signal to noise ratio;

selecting the second set of processed sensor data when the analog sensor data exceeds the threshold signal to noise ratio; and calculating a range between the LiDAR system and the object using extracted time of flight data from the selected set of processed sensor data; and switching from the second set of processed data to the first set of processed data when:

the first set of processed sensor data includes a larger number of detected light pulses of the plurality of light pulses than the second set of processed sensor data.

16. The system as recited in claim 15, wherein the one or more non-transitory computer-readable storage mediums contain further instructions configured to cause the one or more processors to perform operations including:

determining a velocity of the object relative to the vehicle based on changes in the calculated range over time.

17. The system as recited in claim 15, wherein the one or more non-transitory computer-readable storage mediums contain further instructions configured to cause the one or more processors to perform operations including:

applying digital signal processing to the first set of processed sensor data to distinguish the plurality of light pulses from ambient noise.

18. The LiDAR system as recited in claim 15, wherein the time to digital conversion system has a power level threshold that varies with ambient noise levels and is configured to filter noise out of the analog sensor data when generating the first set of processed sensor data.

* * * * *